April 11, 1950 E. M. MANNING 2,504,031
FLOWERPOT SAUCER

Filed June 12, 1947

INVENTOR.
Everett M. Manning
BY Victor J. Evans & Co.

ATTORNEYS

Patented Apr. 11, 1950

2,504,031

UNITED STATES PATENT OFFICE 2,504,031

FLOWERPOT SAUCER

Everett M. Manning, Washington, D. C.

Application June 12, 1947, Serial No. 754,244

2 Claims. (Cl. 47—34)

The present invention relates to the general class of plant husbandry, and more specifically to an improved flower pot saucer in the nature of a shallow container or stand, for supporting a portable plant receptacle and irrigating the soil within the receptacle or flower pot.

The primary object of the invention is the provision of a flower pot saucer consisting of a minimum number of parts that may with facility be manufactured at low cost of production, and assembled with convenience, to assure a durable saucer that is efficient in the performance of its required functions.

To this end the invention consists in certain novel features of construction and combinations and arrangements of parts by means of which the flower pot and the saucer are combined and retained, and the soil is irrigated, as will hereinafter be described and more particularly pointed out in the appended claims.

In the accompanying drawings I have illustrated a complete example of a physical embodiment of my invention wherein the parts are combined and arranged in accord with one mode I have devised for the practical application of the principles of my invention. It will, however, be understood that changes and alterations are contemplated and may be made in these exemplifying drawings and mechanical structures, within the scope of my claims, without departing from the principles of the invention.

Figure 1:
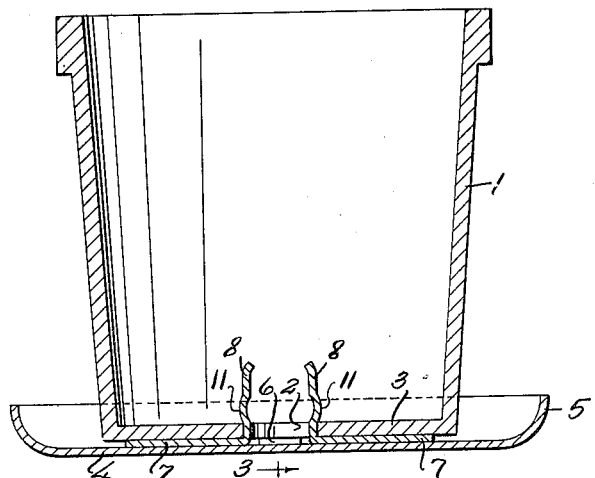
Figure 1 is a central vertical sectional view showing a flower pot supported in a stand or saucer in which my invention is physically embodied.

In order that the general assembly and utility of parts may readily be understood I have shown in Fig. 1 a conventional or standard type of flower pot 1 having a central irrigating opening 2 in its flat bottom 3, and the flower pot is equipped with the novel saucer of my invention.

In the preferred form of the invention I employ a shallow circular saucer that may be stamped or otherwise fashioned from sheet metal, or other suitable material, and provided with a substantially flat bottom 4, and an annular upturned or curled flange 5, to form a shallow receptacle or tray for irrigating water.

To support the flower pot in a slightly elevated position the bottom of the saucer is provided with multiple ribs or ridges on its upper face, which form shallow channels or irrigating spaces beneath the flower pot, and which are centered about the opening 2 in the bottom of the flower pot, for supplying water to the soil within the flower pot.

A suitable number of these supporting ridges or ribs may be employed, and as here shown I employ two sets of diametrically arranged ribs, as 6, 6 and 7, 7, which may be stamped or molded as integral parts of the saucer, or as indicated in the drawings these supporting ribs may be welded or otherwise secured to the upper face of the saucer.

One set or pair of the diametrically arranged ribs, as 7, 7, is provided with spaced, parallel vertically disposed resilient arms or lugs 8, 8, provided with outwardly bowed offset sections 11, and located at their inner adjoining ends, and as shown in Fig. 1 these arms are inserted through the central opening 2 in the bottom 3 of the flower pot, with the sections 11 snapped over the bottom of the pot for retaining the parts in assembled relation.

Figure 2:
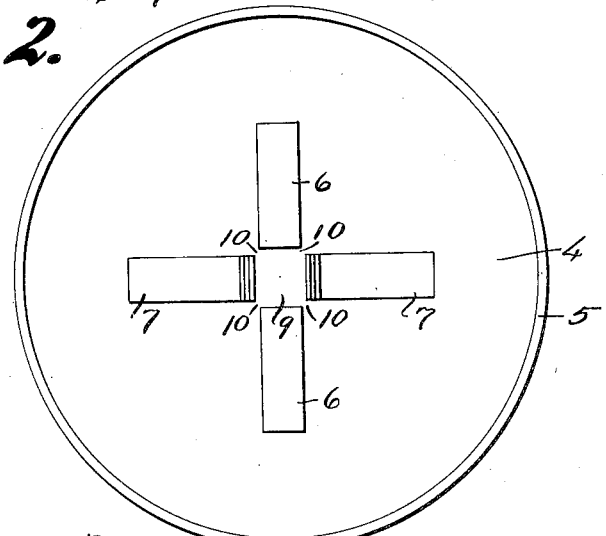
Figure 2 is a top plan view of the saucer.
Figure 3:
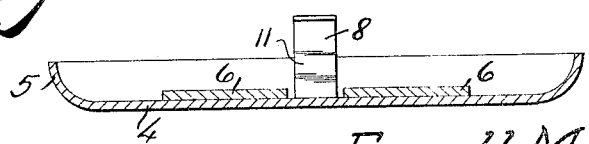
Figure 3 is a vertical central sectional view of the saucer at line 3—3 of Fig. 2.

As best seen in Fig. 2 the two pairs of ribs, at their inner ends, terminate short of the center of the saucer to provide an irrigating space 9 that registers with the central opening of the supported flower pot, and the radial ribs provide a number of channels, as 10 opening into this space for irrigating water passing from the saucer to the flower pot, or from the flower pot to the saucer.

For irrigating the soil within the flower pot, the soil may be watered in usual manner to seep downwardly and outwardly through the opening 2 and space 9, and thence through the channels 10, the excess water being retained within the flanged saucer or receptacle. Or, if desired, a quantity of water may be poured into the saucer, its channels and the central space, and by capillary attraction the water may be fed up through the opening 2 to the soil within the flower pot.

From this description taken in connection with my drawings it will be apparent that I have provided a flower pot saucer of simple construction and operation that performs its functions in a cleanly and sanitary manner, which may readily and with facility be combined with the flower pot, and when necessary or desirable the saucer may conveniently be detached from the flower pot, as for cleansing, and other purposes.

Having thus fully described my invention, what I claim as new and desire to secure by Letters Patent is:

1. A saucer for a flower pot having a centrally disposed opening in the lower end, comprising a shallow tray with a peripheral flange and having flower pot supporting ribs on the upper inner surface, and spring fingers with outwardly bowed sections spaced from the lower ends thereof extended upwardly from the tray and positioned to extend through the centrally disposed opening in the lower end of the flower pot with the outwardly bowed sections extended over the inner surface of the lower end of the flower pot for retaining the saucer on the pot.

2. A saucer for a flower pot having a centrally disposed opening in the lower end, comprising a shallow tray with a peripheral flange and having flower pot supporting ribs on the upper inner surface, said ribs spaced to facilitate passage of water in the saucer to the interior of the pot, and spring fingers with outwardly bowed sections spaced from the lower ends thereof extended upwardly from the tray and positioned to extend through the centrally disposed opening in the lower end of the flower pot with the outwardly bowed sections extended over the inner surface of the lower end of the flower pot for retaining the saucer on the pot.

EVERETT M. MANNING.

REFERENCES CITED

The following references are of record in the file of this patent:

UNITED STATES PATENTS

| Number | Name | Date |
|---|---|---|
| 2,120,599 | Brown | June 14, 1938 |
| 2,140,862 | Sumner | Dec. 20, 1938 |
| 2,206,694 | Greene | July 2, 1940 |